INVENTORS
JOZEF C. MOERKENS
ANTONIUS J. VAN DEN BOGAART
BY

AGENT

United States Patent Office 3,500,125
Patented Mar. 10, 1970

---

3,500,125
STARTING AND OPERATING CIRCUIT FOR
GAS DISCHARGE LAMPS
Jozef Cornelis Moerkens and Antonius Johannes van den Bogaart, Emmasingel, Eindhoven, Netherlands, assignors, by mesne assignments, to U.S. Philips Corporation, New York, N.Y., a corporation of Delaware
Filed Nov. 8, 1967, Ser. No. 681,410
Claims priority, application Netherlands, Nov. 25, 1966, 6616599
Int. Cl. H05b 37/02, 41/14
U.S. Cl. 315—205     6 Claims

ABSTRACT OF THE DISCLOSURE

A starting circuit for a gas discharge tube which provides higher reignition voltage during each operating cycle. A pair of oppositely polarized, parallel connected controlled rectifiers is connected in series with the primary coil of an auto-transformer. Each of a pair of Zener diodes connected in series with the high-voltage secondary of the transformer senses tube ignition during a different half cycle of input voltage, and in response causes an associated controlled rectifier to conduct, thereby connecting the tube to the primary coil of the transformer.

---

The invention relates to a device for starting and supplying with alternating current a gas and/or vapor discharge tube in which the tube is connected to a main circuit and to an auxiliary circuit, the auxiliary circuit serving to start and keep the tube in operation and wherein the main circuit supplies the energy to the tube.

In a known device of the type described the frequency of the alternating current source which supplies the auxiliary circuit is minimally six times larger than the frequency of the alternating current source which supplies the main circuit. The frequency of said latter source is of the order of approximately 50 c./s. The higher frequency of the auxiliary circuit is desired to insure the timely reignition of the tube. In order to obtain a good reignition of the tube at a comparatively high frequency, however, the voltage in the auxiliary circuit also must be rather high, for example, 3000 volts, in order to be able to supply sufficient ignition energy to the tube. Both this higher frequency of the auxiliary circuit and the high voltage in said circuit are disadvantageous. In fact, the higher frequency must as a rule be produced by means of an additional apparatus. The high voltage requires additional insulation measurements.

It is the object of the invention to avoid or at least mitigate said drawbacks.

A device according to the invention for starting and supplying with alternating current a gas and/or vapor discharge tube, in which the tube is connected to a main circuit and to an auxiliary circuit, the auxiliary circuit serving to start and keep the tube in operation and wherein the main circuit supplies the energy to the tube, is characterized in that the auxiliary circuit is connected to an alternating current source of the same frequency as the alternating current source which supplies the main circuit and in which a parallel arrangement of a controlled semiconductor rectifier and a reversely connected rectifier is included in the main circuit, namely in the connection between the supply source of the main circuit and the tube, and in which voltages are derived from the auxiliary circuit which are supplied to the control electrode of the controlled rectifier to make it conductive every other half cycle.

In a device according to the invention the voltage for starting and reigniting the tube by means of the output voltage of the auxiliary circuit may be chosen to be lower because the frequency of said output voltage relative to the frequency of the main circuit now is lower than before the moment of the invention. This lower frequency implies in fact that the energy required for igniting and reigniting the tube needs no longer to be supplied with the help of a high voltage.

It is known per se to incorporate a circuit element, for example, an electromagnetic relay, in the supply circuit of a discharge tube. This relay may also be operated from an auxiliary circuit of the discharge tube. In this known device, however, the relay is actuated only when a tube is defective. In that case the relay switches off the main circuit.

Alternatively a device is known per se for starting and supplying a discharge tube in which a main circuit is used for the actual energy supply to the tube and in which the auxiliary circuit serves to start the tube. This device furthermore comprises a manually operable switch with which the tube is first connected to the auxiliary circuit after which the tube ignites, and in which the tube after the ignition is connected to the main circuit. In this known device the frequency of the supply of the auxiliary circuit is also the same as the frequency of the supply of the main circuit. In this known device, however, the auxiliary circuit only serves to start the lamp but not to keep it in operation, as, for example, ensuring the reignition.

An advantage of a device according to the invention with an automatically operated switching element in the main circuit over a device in which an automatically operated switching element is used in the auxiliary circuit, is that in case of a defective or removed tube the first-mentioned device can automatically stop but remains ready for immediately starting a new lamp, whereas in the second device signals for the switching element must constantly be produced to cause said element to switch.

The rectifier which is reversely connected to the controlled semiconductor rectifier may be, for example, a normal diode. In that case the voltage available for reigniting the lamp in the even half cycles will differ from that in the odd half cycle. This may be undesirable in certain cases, namely in cases in which the required reignition voltage of the lamp, for example, may increase rapidly. In such cases, a sufficient reignition voltage would be available only every other half cycle as a result of which the lamp would burn unquietly.

The rectifier reversely connected to the controlled semiconductor rectifier preferably also is a controlled semiconductor rectifier, whereby voltages are derived from the auxiliary circuit which are applied also to the control electrode of said second controlled rectifier to render it conductive, and whereby the control signals at the control electrodes of the two controlled rectifiers are shifted in phase relative to each other through approximately 180°.

In this preferred embodiment the electric phenomena in the tube show approximately the same image in successive half cycles. This produces a quiet burning of the tube. The lifetime of the tube also is influenced favourably since an asymmetry in the supply is not present now.

The auxiliary circuit could be supplied by an alternating current source different from the main circuit. Both current circuits, of course, ought to have the same frequencies.

The auxiliary circuit and the main circuit are preferably supplied from the same alternating current source.

An advantage of this preferred embodiment is that the voltages in the auxiliary circuit and the main circuit now cannot come out of step as a result of which an ignition at the correct instant of the controlled rectifier(s) in the main circuit is better ensured.

If the auxiliary circuit and the main circuit are supplied from the same alternating current source, the voltage, for example, of the alternating current source destined for the main circuit may be stepped down while the untransformed voltage of an alternating current source is applied to the auxiliary circuit.

The auxiliary circuit preferably comprises a secondary winding of an auto-transformer, the primary winding of said transformer being connected to the alternating current source and in which during operation the vectorial sum of the voltage across the primary and the secondary windings is larger than across the primary winding alone, and in which the main circuit is connected to the primary winding.

In this preferred embodiment the main current of the lamp need not pass a transformer winding. In addition, the wiring of the device may be simple.

Furthermore an impedance is preferably included in the auxiliary circuit. As a result of this it is achieved that the current intensity in the said auxiliary circuit can remain restricted.

The current-restricting impedance may be, for example, a resistor or an inductance which is included in a part of the main and auxiliary circuits which is or is not common.

The said impedance preferably is present in a part of the auxiliary circuit which does not form part of the main circuit, said latter impedance being a capacitor.

This latter preferred embodiment has the advantage, that at the instant the lamp current passes through zero, immediately a quantity of electric energy is available in the auxiliary circuit for reigniting the lamp. The so-called "dark" period, that is the time the tube is extinguished for a moment, can thus be strongly reduced.

A very particular construction of the latter preferred embodiment is obtained if the rectifier reversely connected to the controlled rectifier is a diode, in which a series arrangement of the impedance consisting of the capacitor and the diode is connected to a secondary winding, of a supply transformer, included in the auxiliary circuit.

In the latter device a very good starting of the lamp can be ensured. This is due to the fact that the voltage available for the ignition can increase to a high value, by first charging the said capacitor through the diode, in the half cycle after charging the capacitor. Alternatively, with the same value of the starting voltage supplied by the auxiliary circuit, the transformer could be proportioned for a smaller secondary voltage.

In order that the invention may be readily carried into effect, two examples thereof will now be described in greater detail, by way of example, with reference to the accompanying drawing, in which.

Figure 1:
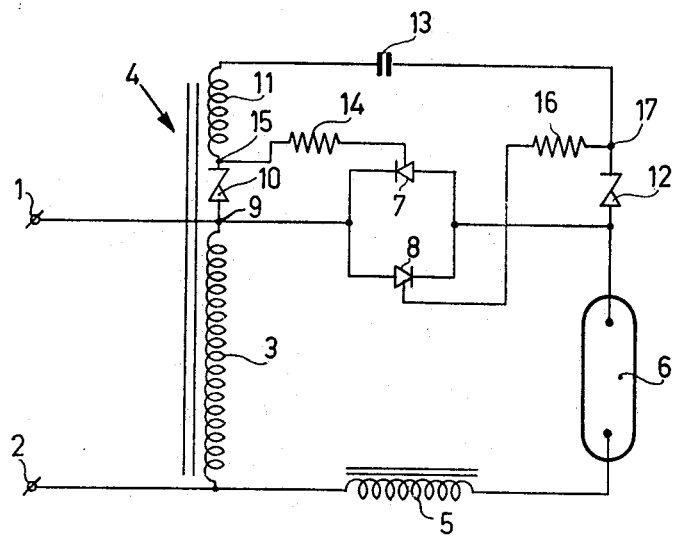
FIGURE 1 is a circuit diagram of a device according to the invention.

Referring now to FIGURE 1, reference numerals 1 and 2 denote terminals for the connection of an alternating current source of, for example, 220 volts, 50 c./s. The primary 3 of an auto-transformer 4 is connected to the terminals 1 and 2. The primary winding 3 is shunted by a series arrangement of an inductance 5, a high pressure mercury vapour discharge tube 6, and a parallel arrangement of two controlled semiconductor rectifiers 7 and 8. These rectifiers 7 and 8 are reversely connected. The said series arrangement 5, 6 (7, 8) forms the main circuit of the device. The end 9 of winding 3 connected to the terminal 1 is connected to a series arrangement of a Zener diode 10 and a subsequent winding 11 of the transformer 4. The winding 11 is connected to a series arrangement of an inductance 5, tube 6, Zener diode 12 and capacitor 13. The series arrangement 5, 6, 12, 13, 11, 10, 9 forms the auxiliary circuit of the device. This auxiliary circuit serves to start and reignite the tube 6. The main circuit 5, 6, 7/8 serves for the actual energy supply to the tube 6.

The control electrode of the controlled rectifier 7 is connected to a tapping 15 between the Zener diode 10 and the transformer winding 11 through a resistor 14.

In an approximately corresponding manner the control electrode of the controlled rectifier 8 is connected to a tapping 17 between the Zener diode 12 and the capacitor 13 through a resistor 16.

The operation of the device described is as follows: When the terminals 1 and 2 are connected to the alternating current source of 220 volts, a voltage is set up across the primary 3 of the transformer. As a result of this a voltage is induced in the winding 11. The voltage across 3 and 11 together is, for example, 500 volts. This voltage is applied to electrodes of the tube 6 through the auxiliary circuit elements 13, 12 and 5 respectively. As a result of this the tube 6 ignites.

As soon as the tube 6 is ignited, a current will flow through the circuit 1, 9, 10, 11, 13, 12, 6, 5, 2. This current will flow through one of the Zener diodes 10 or 12 in the forward direction but through the other Zener diode in the reverse direction. If it is assumed that at the instant of ignition of the tube 6 the terminal 1 was positive, current will flow through the Zener diode 10 in the forward direction and through the Zener diode 12 in the reverse direction. This means that across the last-mentioned diode a voltage is set up of, for example, 7 volts. Now a potential difference is formed, via the resistor 16, between the control electrode of the rectifier 8 and the cathode of the rectifier 8. The control electrode of 8 becomes positive with respect to the cathode. As a result of this the rectifier 8 becomes conductive. Current flows from the terminal 1 through 9, through 8 to tube 6, and subsequently through the stabilisation impedance back to the terminal 2. This is the actual lamp current. If at the end of the half cycle the current through 8 becomes zero, the rectifier 8 again is cut off. Then the auviliary circuit again ignites the tube 6 as a result of which the current in the tube, and consequently also in the auxiliary circuit, flows in the opposite direction, namely in the direction from 2 through 6, 13 to 1. As a result of this a voltage of approximately 7 volts is set up across the Zener diode 10. As a result of this the controlled rectifier 7 is made conductive, through the resistor 17, in a manner approximately corresponding to that described with reference to the rectifier 8.

This process is invariably repeated. The rectifiers are made conductive always approximately 180° after each other.

The residual charge in the capacitor 13 at the instant the current in the main circuit becomes zero, is immediately available to reignite the tube 6 rapidly.

In certain lamps the required reignition voltage, for example, when the lamp becomes warmer, may become so low that the reignition process occurs somewhat differently from what has been described above. If in fact the required reignition voltage is low with respect to the supply alternating voltage of the main circuit, the high voltage of the auxiliary circuit is not necessary for the reignition. The auxiliary circuit then holds a controlled rectifier of the main circuit conductive by the capacitor current at the end of half a cycle of the lamp current in which the tube 6 can reignite already when the last-mentioned controlled rectifier is still conductive. After the reignition the other controlled rectifier is made conductive by the auxiliary circuit.

In a practical case the tube 6 was a high-pressure mercury vapour discharge lamp of 400 watts. The ignition voltage of the tube was 400 volts and the operating voltage 130 volts. The inductance 5 was 0.15 henry, the capacitor 13 has a capacity of 0.2 µf. The resistors 14 and 16 were 200 ohm each.

When the tube 6 is removed, the device shown in FIGURE 1 automatically stops since no current can flow through the Zener diodes and consequently no controlled rectifier can be made conductive.

Figure 2:
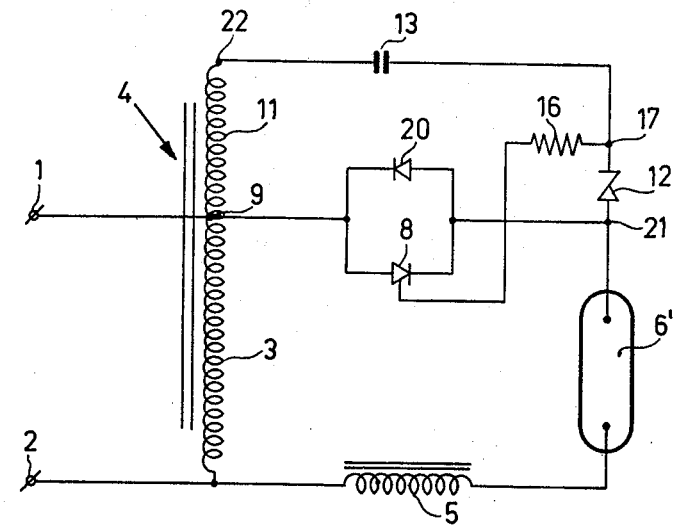
FIGURE 2 is a circuit diagram of a second device according to the invention.

The diagram shown in FIGURE 2 in outline is equal to that in FIGURE 1. Therefore corresponding components have been given the same reference numerals.

The difference between the diagrams shown in FIGURES 1 and 2 is the following. The controlled rectifier 7 (FIGURE 1) is replaced by the diode 20 (FIGURE 2). In FIGURE 2 the auxiliary elements 10 and 14 of FIGURE 1 are lacking.

Starting of the tube 6' of FIGURE 2 occurs as follows:

If the terminal 1 is positive with respect to the terminal 2, so if the end 22 of the winding 11 remote from the point 9 is positive with respect to the point 9, the capacitor 13 is charged namely through the series circuit 22, 13, 17, 12, 21 and the diode 20 to point 9. The capacitor will maintain its charge for some time and in the subsequent half cycle (so if terminal 2 is positive with respect to terminal 1) a voltage is set up across the tube 6' which exceeds the voltage across the windings 3 and 11 of the transformer 4 together. This high voltage ignites the tube 6'. The tube 6' can thus have a higher starting voltage than the tube 6 of FIGURE 1.

If the tube 6' of FIGURE 2 is started, it receives current in one half cycle through the controlled rectifier 8 (in a corresponding manner as in FIGURE 1). The subsequent half cycle always reignites the lamp without auxiliary circuit and conducts current through diode 20.

The diagram of FIGURE 1 thus gives a device with an auxiliary circuit which is operative (gives pulses) each half cycle of the alternating current source (symmetric lamp currents) and the diagram of FIGURE 2 shows a device with an auxiliary circuit which is operative only once per cycle of the alternating current source (asymmetric lamp currents).

Instead of one discharge lamp a plurality of lamps may be supplied with the device, in which these lamps are arranged in series or in parallel, for example. The lamps may alternatively be low-pressure discharge lamps which are provided, for example, with preheated electrodes which are connected, for example, to additional secondary windings of the transformer 3.

What is claimed is:

1. A device for starting and sustaining the ionization in a gas discharge tube, comprising a first means for supplying alternating current to the tube, an auxiliary means for supplying alternating current of the same frequency and of a substantially greater voltage as the first means to the tube, Zener diode means connected in series with the auxiliary supply means for sensing the flow of current through the lamp, and switch means comprising a controlled semiconductor rectifier and a parallel connected reversely polarized rectifier connected to the sensing means and connected intermediate the first supply means and the lamp for maintaining an open circuit between the first supply means and the lamp in response to the absence of current in the lamp and for establishing a conductive path between the first supply means and the lamp in response to a flow of current through the lamp from the auxiliary source.

2. A device as claimed in claim 1, wherein the reversely polarized rectifier is a second controlled rectifier, and wherein the sensing means comprises means for supplying a control signal to each controlled rectifier to alternately establish a conducting path through each controlled rectifier in response to the flow of current through the lamp.

3. A device as claimed in claim 1 wherein the first supply means and the auxiliary supply means comprise respectively the primary and secondary windings of an autotransformer.

4. A device as claimed in claim 1 wherein an impedance is incorporated in the auxiliary supply means.

5. A device as claimed in claim 4, wherein the impedance is arranged in that part of the auxiliary circuit which does not form part of the main circuit, and wherein the impedance is a capacitor.

6. A device as claimed in claim 5, wherein the auxiliary supply means comprises a secondary winding of a supply transformer, wherein the reversely connected rectifier, parallel to the controlled rectifier, is a diode and wherein a series arrangement of the impedance, consisting of the capacitor, and the diode is connected to the secondary winding of the supply transformer.

References Cited

UNITED STATES PATENTS

| 3,320,521 | 5/1967 | Segawa et al. | 315—100 |
| 3,344,311 | 9/1967 | Nuckolls | 315—199 |
| 3,317,789 | 5/1967 | Nuckolls | 315—194 |

JAMES W. LAWRENCE, Primary Examiner

C. R. CAMPBELL, Assistant Examiner

U.S. Cl. X.R.

315—171, 174, 282, 289